US006686905B2

(12) United States Patent
Suzuki et al.

(10) Patent No.: US 6,686,905 B2
(45) Date of Patent: Feb. 3, 2004

(54) KEYBOARD APPARATUS

(75) Inventors: Kazuya Suzuki, Kanagawa-ken (JP); Yohei Tanaka, Kanagawa-ken (JP); Toshikazu Saito, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 270 days.

(21) Appl. No.: 09/865,781

(22) Filed: May 25, 2001

(65) Prior Publication Data

US 2001/0048426 A1 Dec. 6, 2001

(30) Foreign Application Priority Data

May 26, 2000 (JP) .......................................... 2000-157031

(51) Int. Cl.[7] ................................................ G09G 5/00
(52) U.S. Cl. ................................................ 345/168; 341/26
(58) Field of Search ................................ 345/168–172; 341/20, 22, 23, 26

(56) References Cited

U.S. PATENT DOCUMENTS 5,900,867 A * 5/1999 Schindler et al. ............ 345/719
6,064,303 A * 5/2000 Klein et al. .................. 340/506

* cited by examiner

*Primary Examiner*—Regina Liang
(74) *Attorney, Agent, or Firm*—Pearne & Gordon LLP

(57) ABSTRACT

Herein disclosed is a keyboard apparatus which comprises a plurality of keys each including a key holder, a scan board operative to input a key holder signal of each of the key-pushed actions of the keys, a memory for memorizing a key code relevant to the key holder, a plurality of numerical keys each having a key code inputted therein and outputting a key code signal indicative of the key-pushed actions of the numerical keys, a CPU having the key holder signal and the key code signal inputted therein, and state setting means for selectively setting two operation states respectively having the key holder signal and the key code signal outputted from the CPU.

15 Claims, 11 Drawing Sheets

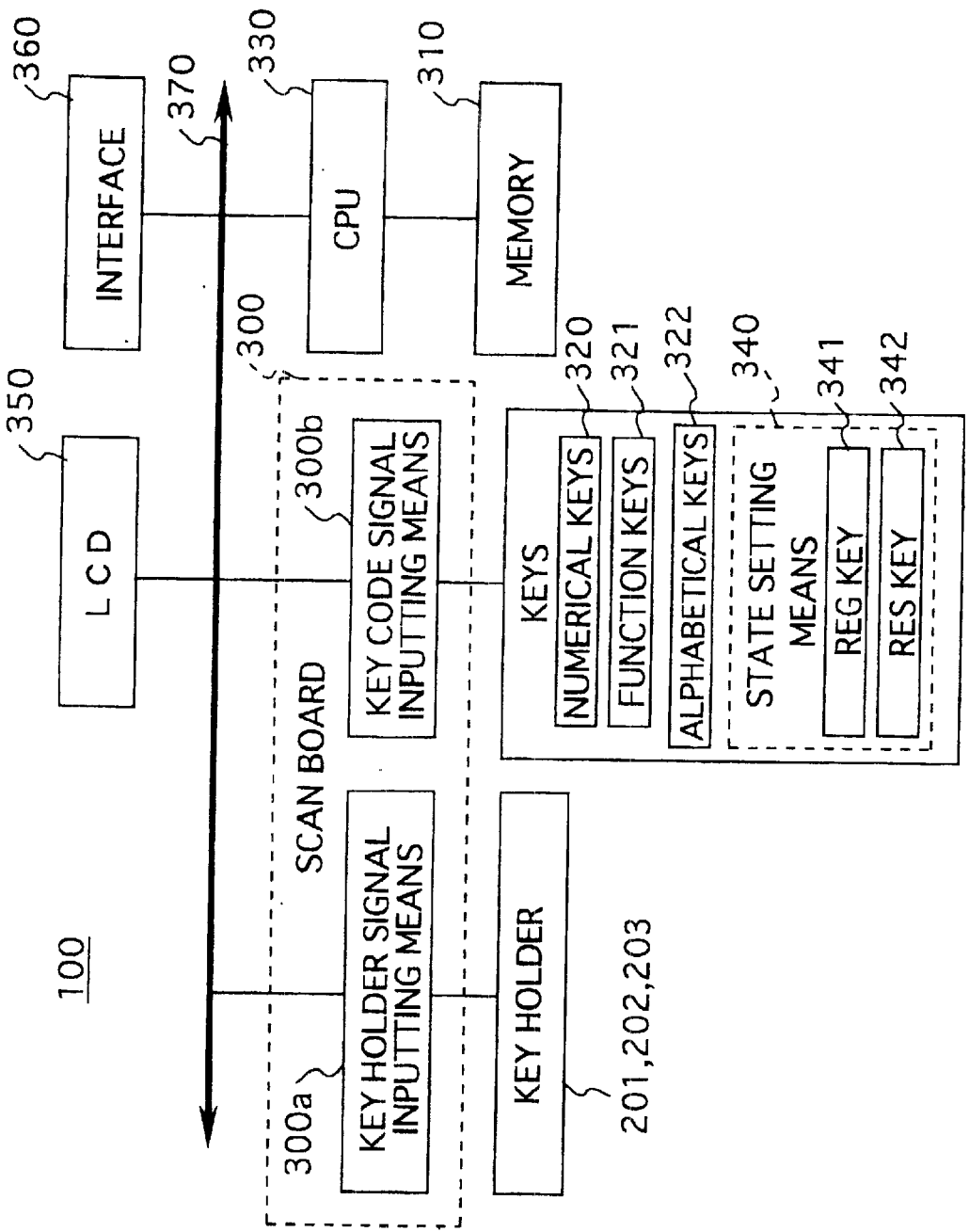

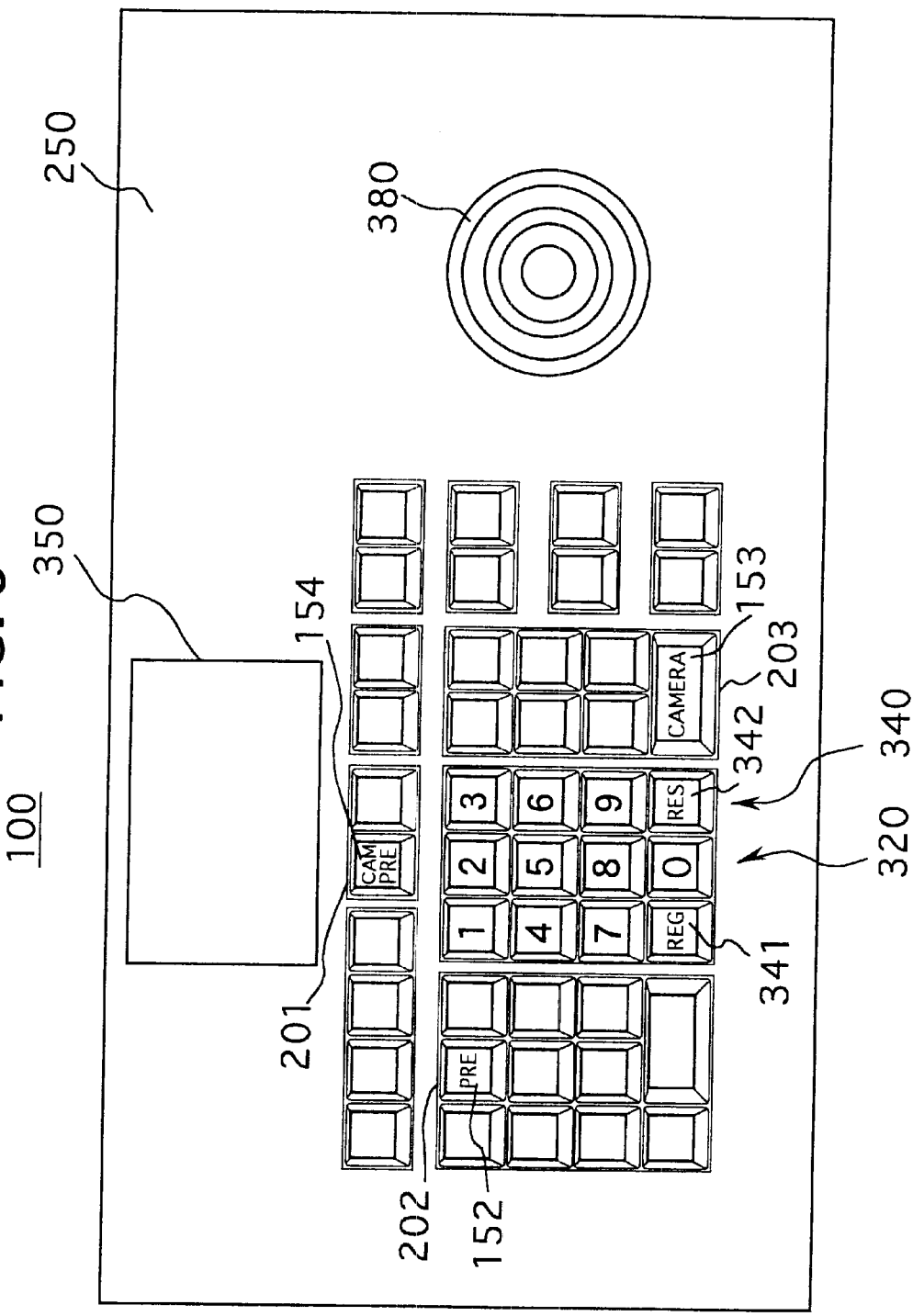

KEYBOARD APPARATUS

BACKGROUND OF THE INVENTION

1. Field of the Invention

The present invention relates to a keyboard apparatus available for a surveillance system.

2. Description of the Related Art

Up until now, there have been proposed a wide variety of conventional keyboard apparatuses suitable for controlling and operating a surveillance system.

The conventional keyboard apparatuses of this type have so far been used for such a surveillance system available for watching unqualified people and other intruders intrude into a special room which does not permit people with any permission from entering. One typical example of the conventional keyboard apparatuses is shown in FIG. 10 as being provided in combination with a prior-art surveillance system 700 which comprises a camera unit 710, a display unit 730 for displaying an image taken by the camera unit 710, and a control unit 740 for controlling the operation of the camera unit 710 in response to operation commands inputted therein.

Description will now be made on how the image taken by the camera unit 710 is displayed on the screen of the display unit 730.

When the camera unit 710 is operated to take an image to be displayed on the screen of the display unit 730, the camera unit 710 is firstly driven by the control unit 740 to transform the image into an image signal outputted to a signal transmitting cable 701. The image signal thus outputted to the signal transmitting cable 701 is then transmitted to a system unit 720 before being inputted to the display unit 730.

The image signal is then transformed into an image to be displayed on the screen of the display unit 730.

In order to have the camera unit 710 operated by the operation commands of the control unit 740 to photograph an image, the control unit 740 is operated to receive the operation commands respectively indicative of the photographing directions, magnifications and the like inputted by an operator while he or she is watching the screen of the display unit 730. The control unit 740 inputted with the operation commands is then operated to transform the operation commands into a command signal to be transmitted to a signal transmitting cable 703. The command signal thus transmitted to the signal transmitting cable 703 is then inputted to the system unit 720 where the command signal is then transformed into a drive signal to drive the camera unit 710 to be outputted to the camera unit 710 by way of the signal transmitting cable 701. The camera unit 710 thus received the drive signal from the system unit 720 is at this time operated to change the photographing directions, magnifications and the like into new ones.

As will be seen from the above, there has been described only one camera unit 710 provided in combination with the system unit 720, the display unit 730, the control unit 740 in the conventional surveillance system for the purpose of simplifying the description and assisting in understanding about the whole operation of the surveillance system.

In reality, such a conventional surveillance system 800, however, is as shown in FIG. 11 to comprise a plurality of camera units 810, a system unit 820, a plurality of display units 830, and a plurality of control units 840. The conventional surveillance system 800 thus constructed allows an operator to selectively operate those control units 840 to input to control units 840 operation commands indicative of selecting one or more camera units 810 and one or more display units 830. This leads to the fact that the operator can select one or more control units 840 not only to have the image displayed on the screen of one or more display units 830 in accordance with the image taken by one or more selected camera units 810 but to operate the camera units 810 under the operation states optioned by the operator.

Here, as the control unit 840 forming part of the conventional surveillance system is used a CCTV (Closed Circuit Television) type of keyboard apparatus which is hereinafter referred simply to "a keyboard apparatus". The keyboard apparatus used heretofore is generally designed to have various command signals inputted therein in response to a wide variety of functions introduced thereinto in recent years other than the functions such as for example a command signal indicative of an operation command to drive a camera and other command signals indicative of operation commands to select and operate any desired camera and displaying units. In general, the keyboard apparatus comprises a plurality of keys including a SHIFT key, an ALT key and other function keys which are combined with other keys to be put in practical use to enable various kinds of operation command to be inputted therein.

Through the repeated use by the operators of the keyboard apparatus thus constructed, the operators have found it necessary that additional functions related to the command signals be assigned to additional new keys, respectively, while unnecessary keys be forced to be ineffective. Further, it has been found that there is a strong needs to dispose keys at respective desirable positions on the keyboard depending upon the operators' request for facilitating the operability of the keys frequently used, or in compliance with the needs by either right-handed or left-handed operator. To meet the operators' needs, there has been developed one of the prior-art keyboard apparatuses which comprises a display unit accommodated in each of the keys to display the respective letters of the keys changed in their positions by a desired software to ensure that the additional functions related to the command signals are assigned to additional new keys, respectively, unnecessary keys are forced to be ineffective, and the keys are disposed at respective desirable positions.

However, the conventional keyboard apparatus encounters such a problem that the conventional keyboard apparatus is complicated in structure and thus high in production cost, resulting from being required to have a display unit accommodated in each of the keys to display the respective letters of the keys changed in their positions.

SUMMARY OF THE INVENTION

It is, therefore, an object of the present invention to provide a keyboard apparatus which facilitates to change the operability of the keys frequently used for right-handed and left-handed operators.

It is another object of the present invention to provide a keyboard apparatus which ensure that the additional functions related to the command signals are assigned to additional new keys, respectively, unnecessary keys are forced to be ineffective, and the keys are disposed at respective desirable positions.

According to one aspect of the present invention, there is provided a keyboard apparatus for controlling and operating at least one exterior appliance, comprising; a key retainer; a plurality of keys each operatively arranged on said key retainer to perform a key-pushed action and a key-released action, each of said keys being operative to input a signal indicative of the key-pushed action and including a key holder and a key top mounted on the key holder; key holder signal inputting means for inputting a key holder signal indicative of said key-pushed action of each of said keys when said key holder is operated and moved to perform said key-pushed action, said key code signal inputting means including a plurality of numerical keys; information recording means for recording specific relevant information between the key holder signal inputted by said key holder signal inputting means and said key code signal inputted by said key code signal inputting means; signal processing means for receiving and processing said key holder signal from said key holder signal inputting means and said key code signal from said key code signal inputting means, and said signal processing means being operative to selectively assume two different operation states consisting of a first operation state under which the specific relevant information is formed based on said inputted key holder signal and said inputted key code signal to be recorded in said information recording means and a second operation state under which said key code signal is prepared in response to said key holder signal from said key holder signal inputting means in accordance to said specific relevant information recorded in said information recording means and then is outputted to said exterior appliance; and, state setting means for selectively setting said first and second operation states by operating at least one specific key selected from among said keys.

The key holder of the key may have an own key code, and the key top of the key has an own letter indicated thereon, the key top being changeable on the basis of the key code changed.

The letters may include alphabets and numbers.

The keyboard apparatus may further comprise a display unit for displaying the specific relevant information between the key holder signal and the key code signal formed when the specific key is brought into the key-pushed action.

The key code signal inputting means may include a plurality of numerical keys including a key holder, and a key top securely mounted on the key holder.

The state setting means may include a first operation state holding key for allowing the signal processing means to assume the first operation state, and a second operation state holding key for allowing the signal processing means to assume the second operation state, each of the first and second operation state holding keys including a key holder, and a key top securely mounted on the key holder.

The information recording means may be operated by the exterior appliance to record therein the specific relevant information between the key holder signal and the key code signal.

The keyboard apparatus may further comprise a first area having a plurality of non-numerical keys arranged therein and a second area having a plurality of numerical keys arranged therein, the key top of each of the non-numerical keys detachably mounted on the key holder of each of the numerical keys to constitute the key holder signal inputting means while the key top of each of the numerical keys being securely mounted on the key holder of each of the numerical keys to collectively constitute the key code signal inputting means.

According to another aspect of the present invention, there is provided a keyboard apparatus for controlling and operating at least one exterior appliance, comprising: a key retainer; a plurality of first and second keys each operatively arranged on the key retainer to perform a key-pushed action and a key-released action, each of the first keys being operative to input a first signal indicative of the key-pushed action of each of the first keys and each including a key holder, and a key top mounted on the key holder, and each of the second keys being operative to input a second signal indicative of the key-pushed action of each of the second keys and each including a key holder, and a key top mounted on the key holder; first signal inputting means for inputting a first signal indicative of the key-pushed action of each of the first keys when each of the first keys is operated and moved to perform the key-pushed action; second signal inputting means for inputting a second signal indicative of the key-pushed action of each of the second keys when each of the second keys is operated and moved to perform the key-pushed action; information recording means for recording specific relevant information between the first signal inputted from the first signal inputting means and the second signal inputted from the second signal inputting means, the specific relevant information being formed by at least one specific second key selected from among the second keys and brought into the key-pushed action; signal processing means for receiving and processing the first signal from the first signal inputting means and the second signal from the second signal inputting means, the signal processing means being operative to selectively assume two different operation states consisting of a first operation state under which the specific relevant information is recorded by the information recording means in accordance with the first signal inputted by the first signal inputting means and the second signal inputted by the second signal inputting means, and a second operation state under which the second signal in response to the first signal from the first signal inputting means is outputted to the exterior appliance in accordance to the specific relevant information recorded by the information recording means; and state setting means for selectively setting the first and second operation states.

The key holder of each of the first keys may have an own key code represented by the first signal, and the key top of each of the first keys has own letters indicated thereon, the key top being changeable on the basis of the key code changed.

The letters may include alphabets and numbers.

The keyboard apparatus may further comprise a display unit for displaying the specific relevant information between the first signal and the second signal formed when the specific second key is brought into the key-pushed action.

The second signal inputting means may include a plurality of numerical keys including a key holder, and a key top securely mounted on the key holder.

The state setting means may include a first operation state holding key for allowing the signal processing means to assume the first operation state, and a second operation state holding key for allowing the signal processing means to assume the second operation state, each of the first and second operation state holding keys including a key holder, and a key top securely mounted on the key holder.

The information recording means may be operated by the exterior appliance to record therein the specific relevant information between the first signal and the second signal.

The keyboard apparatus may further comprise a first area having the first keys arranged therein and each constituted by a non-numerical key, and a second area having the second keys arranged therein and each constituted by a numerical key, the key top of each of the first keys detachably mounted on the key holder of each of the first keys to constitute the first signal inputting means while the key top of each of the second keys being securely mounted on the key holder of each of the second keys to collectively constitute the second signal inputting means.

BRIEF DESCRIPTION OF THE DRAWINGS

The objects, features and advantages of the present invention will become apparent as the description proceeds when taken in conjunction with the accompanying drawings, in which:

FIG. 3 is a plan view similar to FIG. 1 but showing keys disposed at respective desirable positions;

DESCRIPTION OF THE PREFERRED EMBODIMENTS

One of the preferred embodiments of the keyboard apparatus according to the present invention will be described hereinlater.

Figure 1:
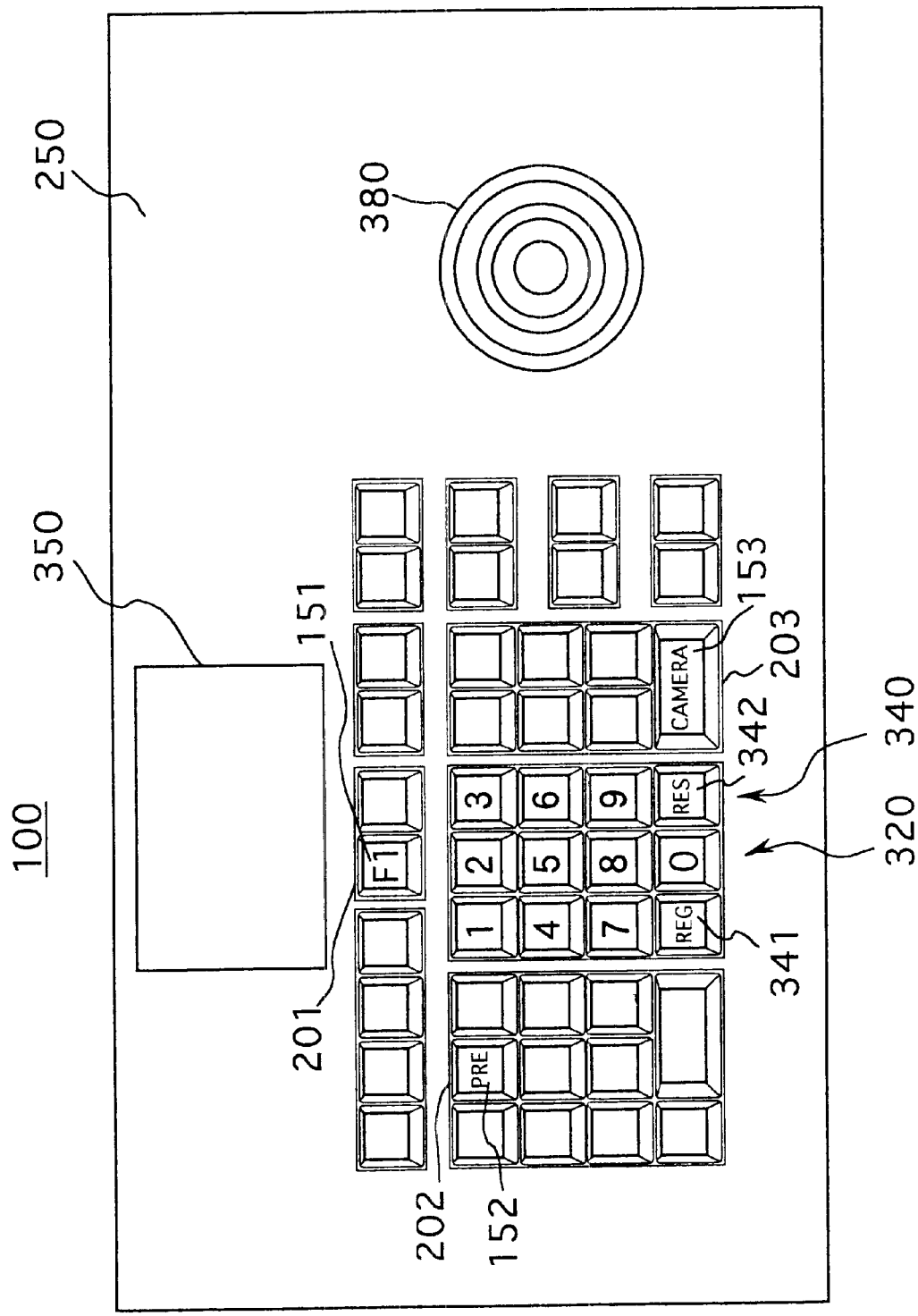
FIG. 1 is a plan view of one preferred embodiment of a keyboard apparatus according to the present invention.
Figure 4A:
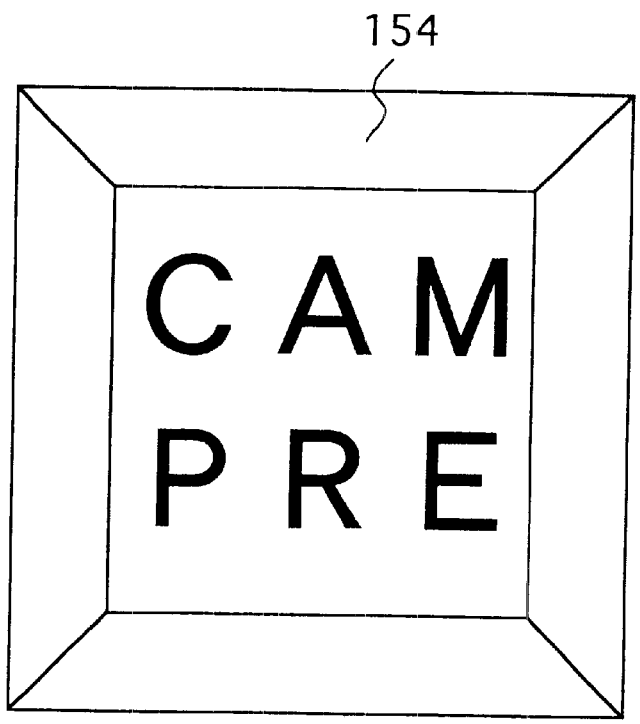
FIG. 4A is a plan view of a key top mounted on a key holder forming part of the keyboard apparatus according to the present invention and showing letters indicated thereon.
Figure 4B:
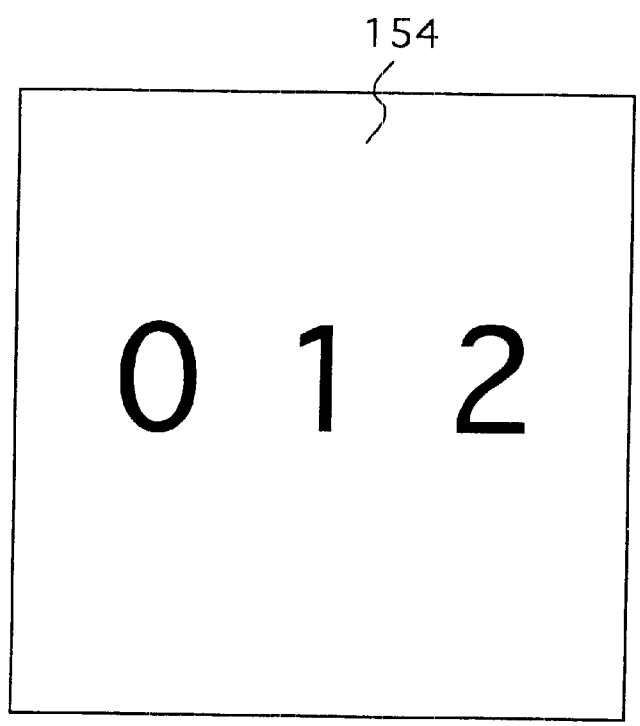
FIG. 4B is a plan view of a key top mounted on a key holder forming part of the keyboard apparatus according to the present invention and showing numbers indicated thereon.
Figure 5:
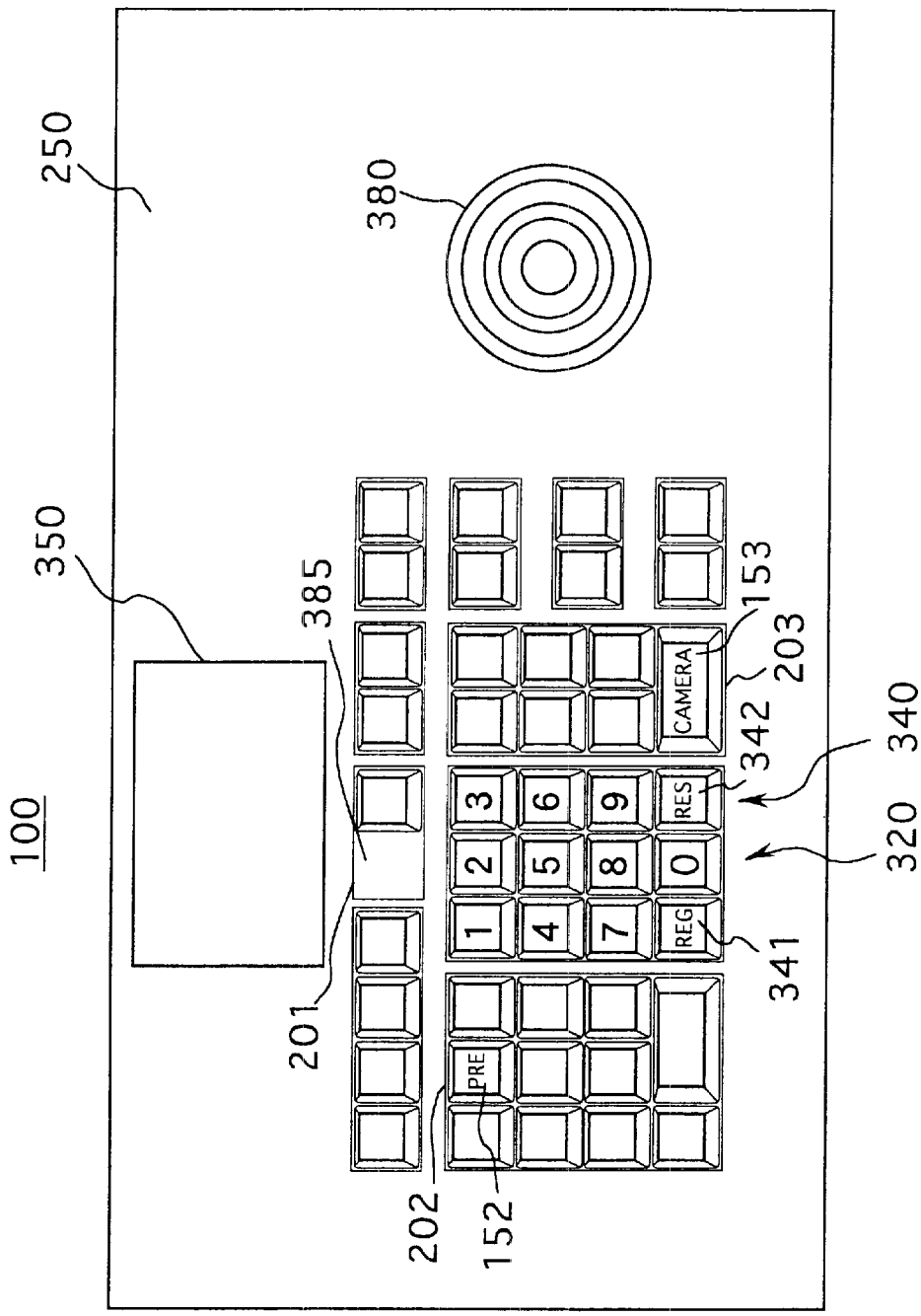
FIG. 5 is a plan view similar to FIG. 1 but showing keys disposed at respective desirable positions.

Referring now to the drawings, in particular, to FIGS. 1 to 6, there is shown one of the preferred embodiments of the keyboard apparatus according to the present invention. The keyboard apparatus 100 comprises a key retainer 250, and a plurality of keys each operatively arranged on the key retainer 250 to perform a key-pushed action and a key-released action. Each of the keys is operative to input a signal indicative of the key-pushed action and includes a key holder 201 to 203 and a key top mounted on the key holder 201 to 203. Each of the key holders 201 to 203 of the keys has an own key code. Each of the key tops of the keys has an own letter indicated thereon. Each of the key tops of the keys is changeable on the basis of the key code changed. Each of the letters of the key tops of the keys includes alphabets and numbers. The keys includes a plurality of ordinary keys such as for example numerical keys 320 and alphabetical keys 322, and a plurality of function keys 321 such as for example, a F1 key 151, a PRE key 152 and a CAMERA key 153, the latter three of which will be described in more detail hereinafter. All the keys have respective key tops each indicated by a specific number or letter as shown in FIG. 1.

Figure 2:
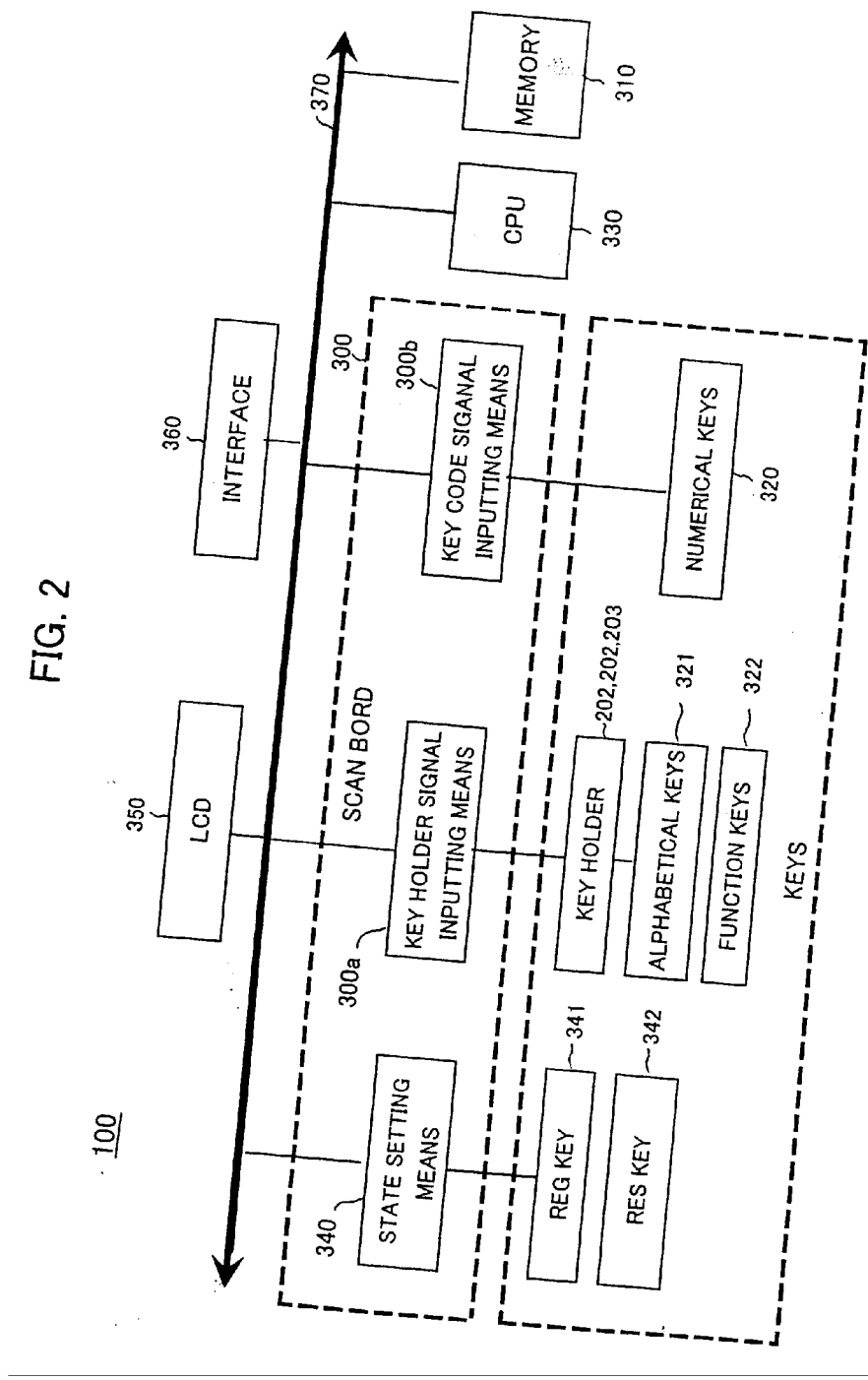
FIG. 2 is a block diagram showing a scan board, a memory, a central processing unit, a liquid crystal display, and an interface forming part of the keyboard apparatus according to the present invention.

As best shown in FIG. 2, the keyboard apparatus 100 further comprises a scan board 300, a memory 310, a central processing unit 330, hereinafter simply referred to as "CPU", a liquid crystal display 350, hereinafter simply referred to as "LCD", an interface 360, and a bus 370 electrically connected to the scan board 300, the memory 310, the CPU 330, the LCD 350, and an interface 360. The scan board 300, the memory 310, the CPU 330, the LCD 350, and the interface 360 are accommodated in the key retainer 250, while the LCD 350 has a screen having a screen surface flush with the upper surface of the key retainer 250 and is partly housed in the key retainer 250.

The keyboard apparatus 100 further comprises key holder signal inputting means 300a and key code signal inputting means 300b which are partly provided in the scan board 300. The key holder signal inputting means 300a is designed to input a key holder signal indicative of the key-pushed action of each of the keys when each of the key holders 201 to 203 is operated and moved to perform the key-pushed action. The key code signal inputting means 300b is adapted to input a key code signal indicative of the key-pushed action of each of said keys when each of the keys is operated and moved to perform the key-pushed action. The key code signal inputting means 300b includes a plurality of numerical keys 320 including a key holder, and a key top securely mounted on the key holder. In this embodiment, the numerical keys 320 are used for forming one of the key codes. For example, the numerical keys 320 "0", "4" and "8" pushed in this order cause a key code "048" to be formed for a key code signal. According to the present invention, any number of numerical keys 320 may be used for forming a key code.

The key code signal inputting means 300b is constituted by the part of the scan board 300 and the keys. The key code signal inputting means 300b may include a plurality of numerical keys 320 which are selectively combined to form a plurality of desired key codes according to the present invention. Also, the key code signal inputting means 300b may replace the numerical keys 320 and thus may include a plurality of ordinary keys other than the numerical keys 320. The ordinary keys can be selectively combined to form a plurality of desired key codes in a similar manner to the numerical keys 320.

The keyboard apparatus 100 further comprises a first area having a plurality of non-numerical keys 151 to 153 arranged therein and a second area having a plurality of numerical keys 320 arranged therein. The key top of each of the non-numerical keys 151 to 153 detachably mounted on the key holder 201 to 203 of each of the non-numerical keys 151 to 153 to constitute the key holder signal inputting means 300a. While the key top of each of the numerical keys 320 is securely mounted on the key holder of each of the numerical keys 320 to collectively constitute the key code signal inputting means 300b.

The keyboard apparatus 100 further comprises information recording means constituted by the memory 310 which is designed to record specific relevant information between the key holder signal inputted from the key holder signal inputting means 300a and the key code signal inputted from the key code signal inputting means 300b. The specific relevant information is formed by at least one specific key selected from among the keys and brought into the key-pushed action. The key includes numerical, alphabetical and any other keys the operator wishes to select. According to the present invention, the specific relevant information may be formed by a plurality of specific keys selected from among the keys and brought into the respective key-pushed actions. Further, the keys include numerical, alphabetical and any other keys the operator wishes to select.

The memory 310 is adapted to allow the CPU 330 to record the specific relevant information therein and to read out the specific relevant information into the CPU 330 therefrom. The memory 310 is operated by the exterior appliance 390 to record therein the specific relevant information between the key holder signal and the key code signal.

The keyboard apparatus 100 further comprises signal processing means constituted by the CPU 330 which is operated to receive and process the key holder signal from the key holder signal inputting means 300a and the key code signal from the key code signal inputting means 300b. The signal processing means, i.e., the CPU 330 is operative to selectively assume two different operation states consisting of a first operation state under which the specific relevant information is recorded by the memory 310 in accordance with the key holder signal inputted by the key holder signal inputting means 300a and the key code signal inputted by the key code signal inputting means 300b, and a second operation state under which the key code in response to the key holder signal from the key holder signal inputting means 300a is outputted to the exterior appliance 390 in accordance to the specific relevant information recorded by the memory 310.

The keyboard apparatus 100 further comprises state setting means 340 for selectively setting the first and second operation states of the CPU 330. The state setting means 340 includes a first operation state holding key, such as for example a REG key 341, for allowing the CPU 330 to assume the first operation state, and a second operation state holding key, such as for example a RES key 342, for allowing the CPU 330 to assume the second operation state. Each of the first and second operation state holding keys includes a key holder, and a key top securely mounted on the key holder. The key-pushed actions of the REG key 341 and the RES key 342 cause the CPU 330 to be operated to hold the first and second operation states, respectively. The state setting means 340 is thus constituted by the CPU 330 and the first and second state holding keys.

The keyboard apparatus 100 further comprises a display unit constituted by the LCD 350 which is operated to display the specific relevant information between the key holder signal and the key code signal formed when the specific keys are under the key-pushed actions. The display unit, i.e., the LCD 350 serves to have the operator readily confirm his or her operation conditions of the exterior appliance 390 through the screen of the LCD 350.

The interface 360 is adapted to allow the key code signal in response to the key holder signal from the key holder signal inputting means 300a to be outputted through a signal transmitting cable 391 to the exterior appliance 390 such as for example watching cameras by the key code signal inputting means 300b in accordance to the specific relevant information recorded by the memory 310.

In FIGS. 1, 3, 5 and 6, there are shown keys bearing respective key tops for example represented by the letters "REG", "RES", "PRE", "CAMERA", "F1", "CAMPRE", and numbers "0" to "9". However, all the keys other than the above keys have respective key tops having in reality their own letters that are not shown in FIGS. 1, 3, 5 and 6.

The operation of the keyboard apparatus 100 will be described hereinafter with reference to the flowcharts shown in FIGS. 7 and 8.

Figure 7:
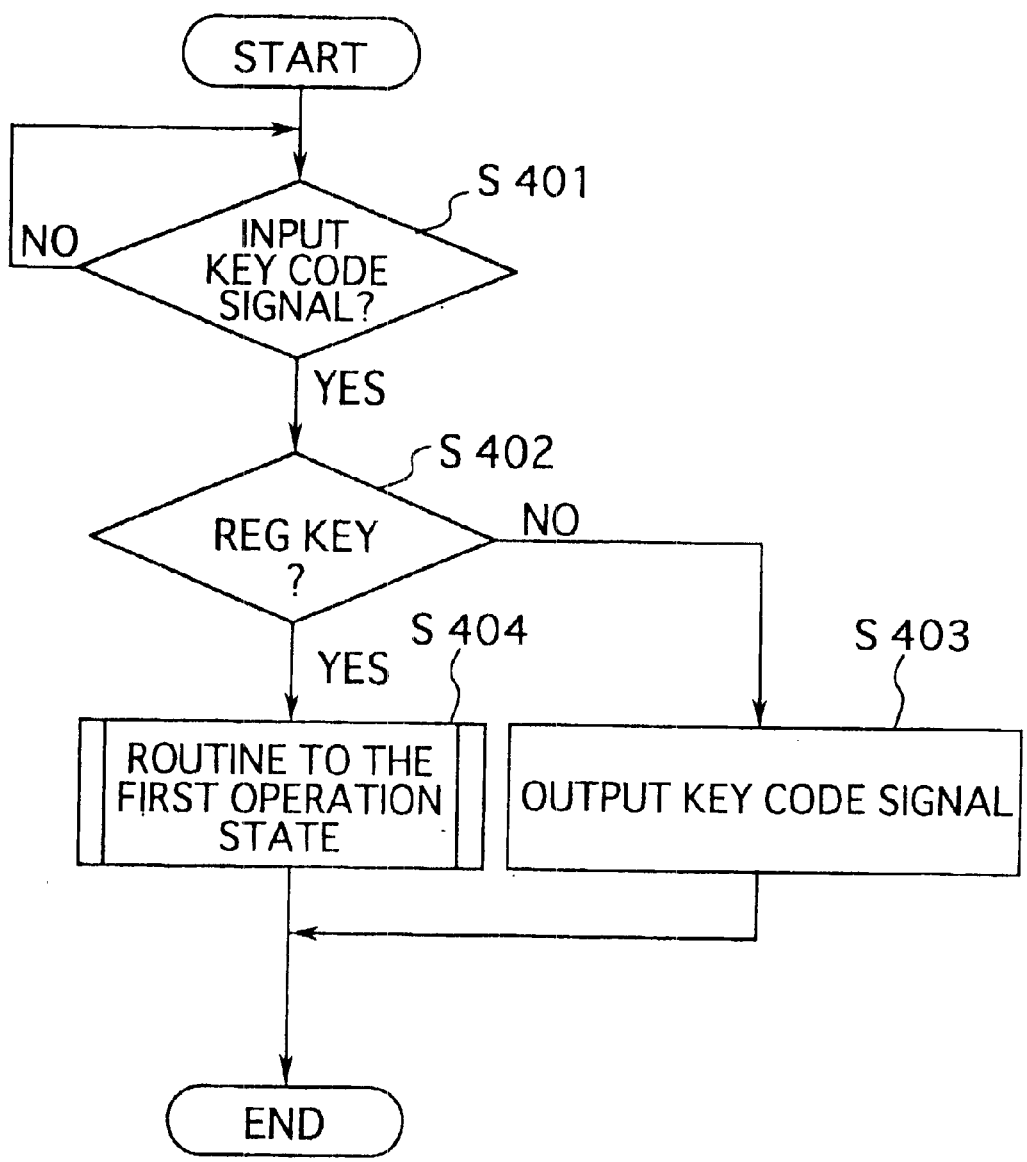
FIG. 7 is a flowchart showing a process performed by the keyboard apparatus according to the present invention.
Figure 8:
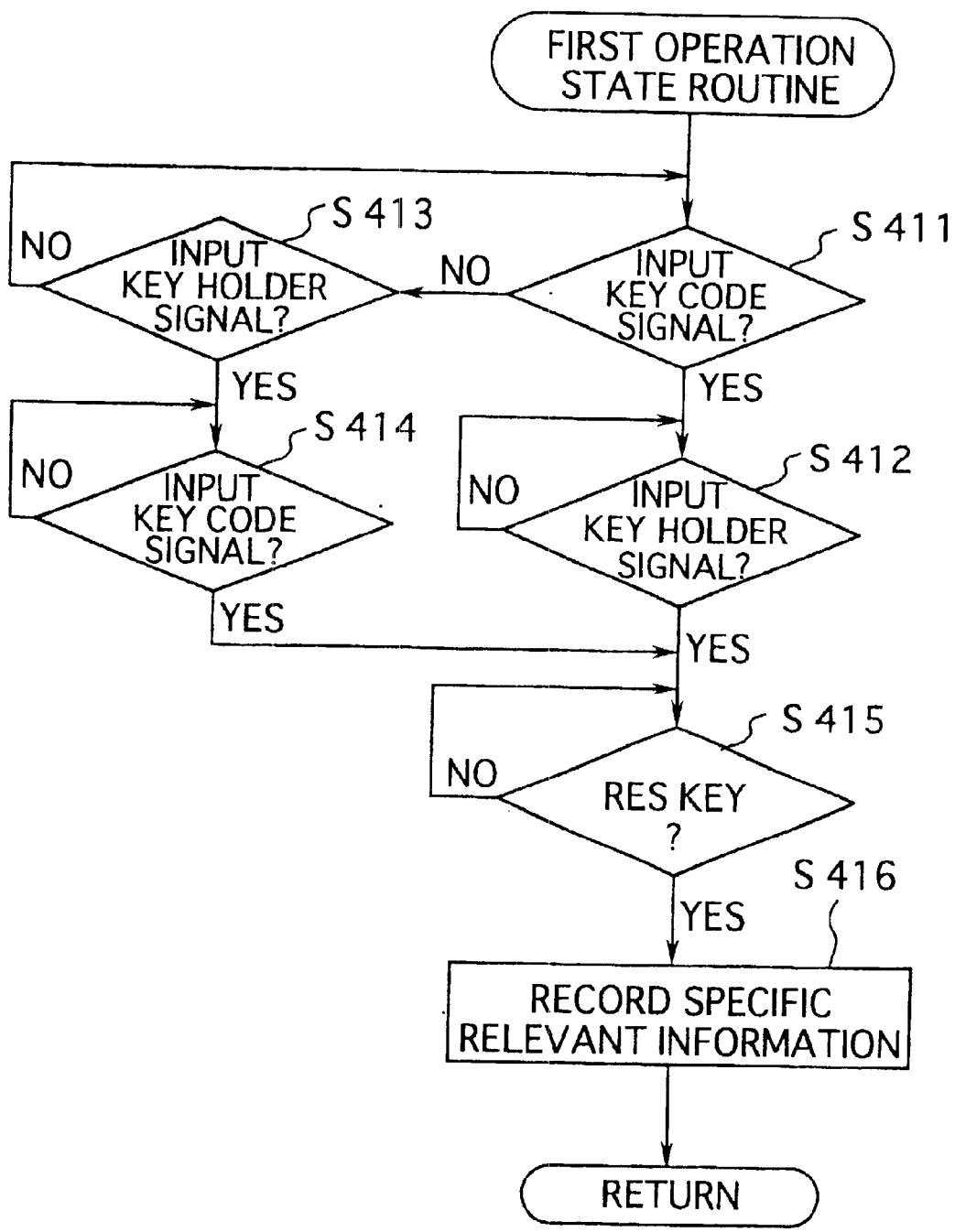
FIG. 8 is a flowchart similar to FIG. 7 but showing a process following the process shown in FIG. 7.
Figure 9:
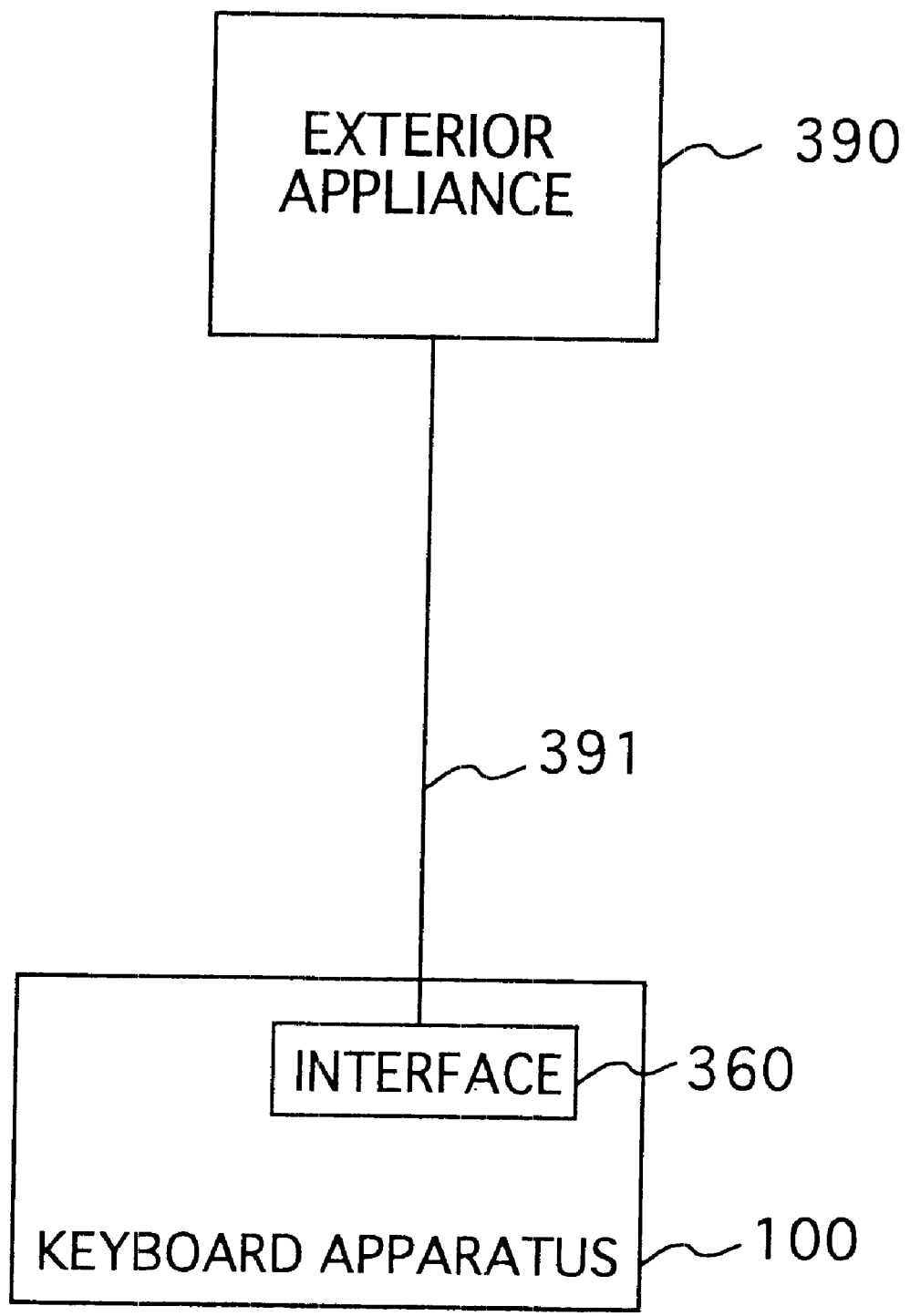
FIG. 9 is a block diagram showing the keyboard apparatus according to the invention and an exterior appliance operatively connected with the keyboard apparatus.
Figure 10:
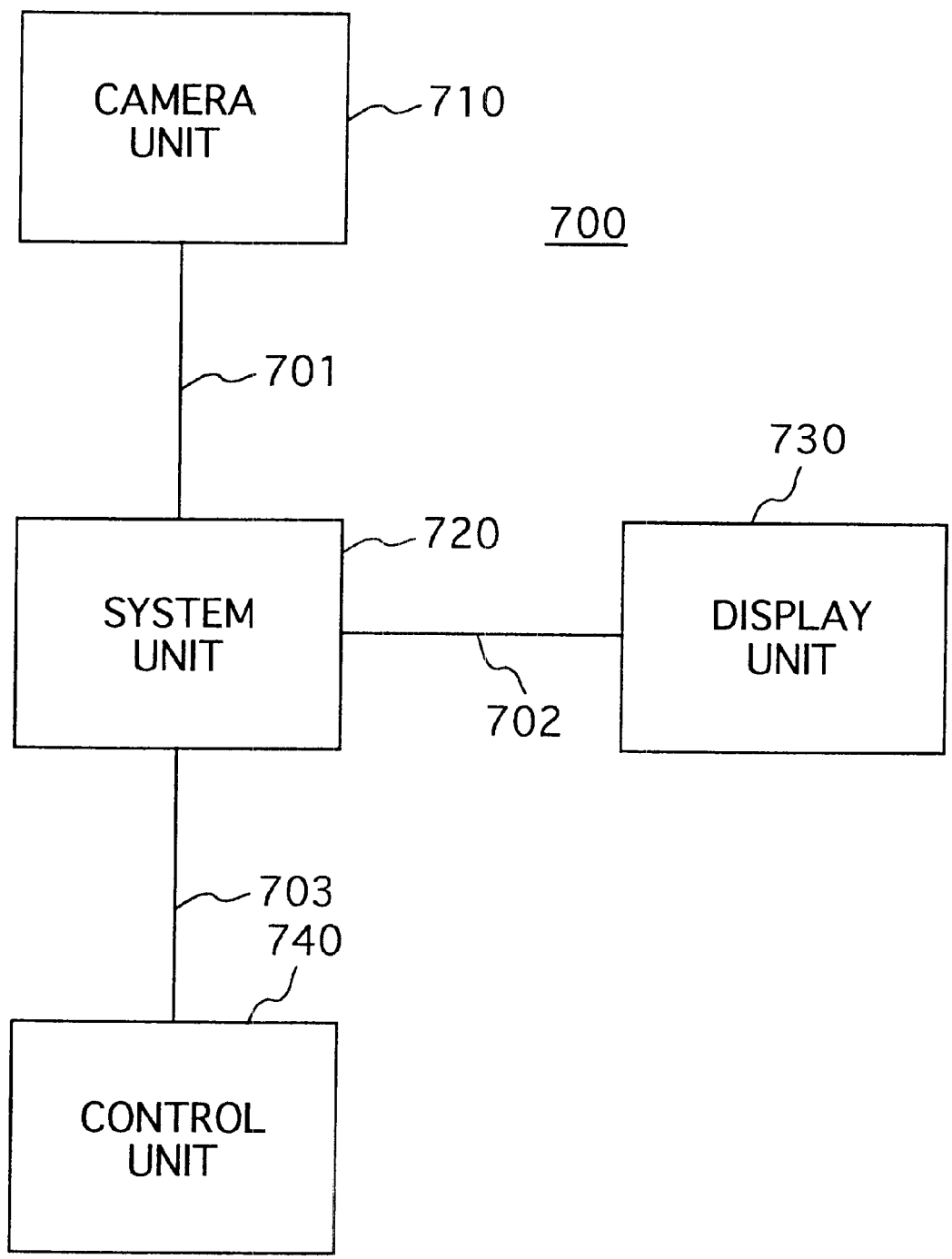
FIG. 10 is a block diagram of one example of a conventional surveillance system.
Figure 11:
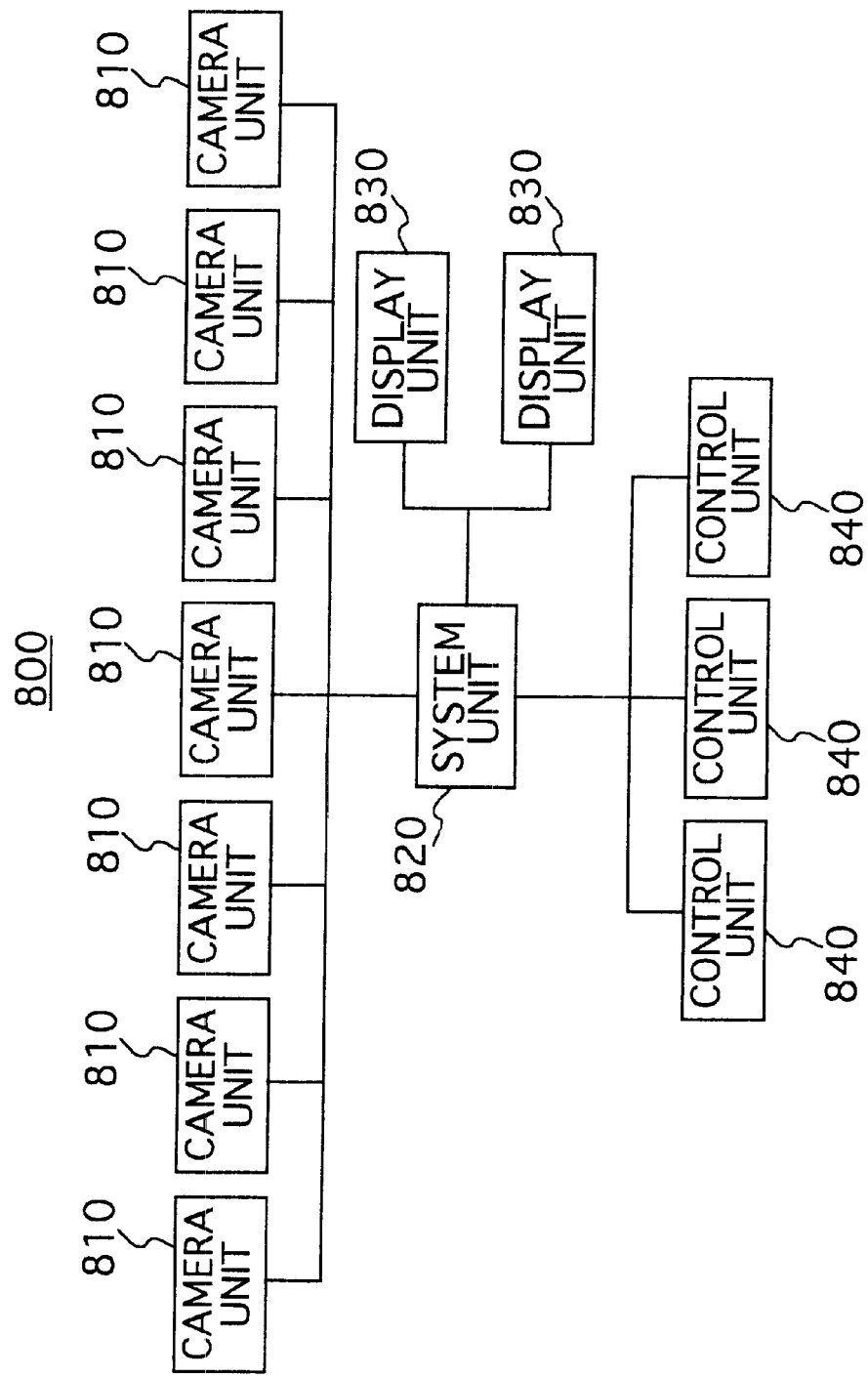
FIG. 11 is a block diagram of another example of the conventional surveillance system.

The flowcharts appearing in FIGS. 7 and 8 show steps to be performed by one of the preferred embodiments of the keyboard apparatus 100 according to the present invention, however, the steps according to the present invention are not limited to these steps.

Referring now to FIGS. 1, 2 and 7, the following description is directed to the fact that the keyboard apparatus 100 is operated to have the keys other than the REG key 341 pushed to input the key code signals indicative of the key codes in response to the pushed keys to the exterior appliance 390 through the interface 360. In order to simplify the following description, the PRE key 152 is raised as a key other than the REG key 341 for the operator to operate.

In step S401, the CPU 330 is held in a condition to have the key code signal outputted from the CPU 330, and thus under its condition waiting for either the key holder signal or the key code signal until any one of the key holder signal and the key code signal is inputted into the CPU 330. The step S401 is repeated when the key holder signals and the key code signals are not inputted into the CPU 330.

When the operator then pushes the PRE key 152, the scan board 300 is operated to output the key code signal indicative of the key-pushed action of the PRE key 152 to the bus 370. The key code signal thus outputted to the bus 370 is then inputted to the CPU 330 through the bus 370. With the key code signal inputted to the CPU 330, the CPU 330 is operated to determine whether the operator pushes the REG key 341 or not in step S402.

When the CPU 330 determines that the operator pushes any key other than the REG key 341, the CPU 330 is operated to output to the bus 370 the key code signal such as for example "001" indicative of the key-pushed action of the PRE key 152 in accordance with the relevant information between the key holder signal and key code signal recorded in the memory 310 in step S403. The CPU 330 is again held under its condition waiting for the key code signal after the CPU 330 is operated to output to the bus 370 the key code signal "001" indicative of the key-pushed action of the PRE key 152 in step S401. The key code signal "001" outputted to the bus 370 is inputted into the interface 360 through the bus 370. The interface 360 is then operated to output the key code signal "001" to the exterior appliance 390.

Referring then to FIGS. 1 to 4, 7 and 8, the description will then be made about the fact that the keyboard apparatus 100 is operated to output to the exterior appliance 390 through the interface 360 a key code signal indicative of the key-pushed action of the key holder which is to be changed to have another operation command. The following example is directed to the case that the key holder is assigned to have an additional operation command inputted into the CPU 330 and to have another key top indicative of CAMPRE key 154 changed from the key top indicative of the F1 key 151 under the condition that the additional operation command being identical to the operation command generated with the PRE key 152 and the CAMERA key 153 concurrently held in the respective key-pushed actions.

Here, the keyboard apparatus 100 is assumed to be used in combination with a surveillance system which comprises a plurality of watching cameras bearing respective numbers different from each other. The concurrent key-pushed actions of the PRE key 152 and the CAMERA key 153 are performed to produce an image on the screen of the LCD 350 which is identical to the image taken by the camera bearing its number smaller than that of the camera. If the operator can have the key holder 201 to 203 assigned to have an operation command inputted into the CPU 330, the operation command being identical to the operation command generated with the PRE key 152 and the CAMERA key 153 concurrently held in the respective key-pushed actions, the key pushed action of the key holder 201 to 203 can produce an image on the screen of the LCD 350 which is identical to the image taken by the camera bearing its number smaller than that of the camera. In this way, the keyboard apparatus 100 can transfer the functions of the PRE key 152 and the CAMERA key 153 to the key holder 201 to 203 so that the joystick 380 and the key holder 201 to 203 can readily be operated by one hand. This makes it possible for the operator to operate the joystick 380 to displace the cameras or change the directions of the cameras while concurrently operating the key holder 201 to 203 to move one camera to other cameras. It is thus to be understood that the keyboard apparatus 100 according to the present invention enables to enhance its operability to a higher level than that of the conventional keyboard apparatus.

It is to be understood from the previous description that the keyboard apparatus according to the present invention can facilitate to change key code signals, i.e., the contents of the operation commands depending upon the needs by the operator to allow the operator to readily operate the keys.

The following description is directed to how the keyboard apparatus 100 can transfer the functions of the PRE key 152 and the CAMERA key 153 to the F1 key 151 to ensure that the F1 key can readily be operated by one hand.

In step S401, the CPU 330 is held in a condition to have the key code signal outputted from the CPU 330, and thus under its condition waiting for either the key holder signal or the key code signal until any one of the key holder signal and the key code signal is inputted into the CPU 330. Therefore, the condition of the CPU 330 includes a second operation state under which the key code signal in response to the key holder signal from the key holder is outputted to the exterior appliance 390 in accordance to the specific relevant information recorded by the memory 310. The step S401 is repeated when the key holder signal and the key code signal are not inputted into the CPU 330.

When the operator then pushes the REG key 341, the scan board 300 is operated to output the key code signal indicative of the key-pushed action of the REG key 341 to the bus 370. The key code signal thus outputted to the bus 370 is then inputted to the CPU 330 through the bus 370. With the key code signal inputted to the CPU 330, the CPU 330 is operated to determine whether the operator pushes the REG key 341 or not in step S402.

When the CPU 330 determines that the operator pushes the REG key 341, the CPU 330 is operated to perform a routine to a first operation state in step S404. Under the first operation state, the CPU 330 has the first operation state routine performed while having the second operation state routine stopped. This means that the CPU 330 is held under its condition under which the specific relevant information is recorded by the memory 310 in accordance with the key holder signal inputted by the key holder signal inputting means 300a and the key code signal inputted by the key code signal inputting means 300b in steps S411 and S413.

In the steps S411 and S413, the condition of the CPU 330 lasts until either the key holder signal or the key code signal is inputted into the CPU 330.

For example, the numerical keys 320 is operated by the operator to input the numbers "012", i.e., the key code "012" appearing on the back surface of the key top of the CAMPRE key 154 (see FIGS. 4A and 4B) with the PRE key 152 and the CAMERA key 153 concurrently pushed by the operator. The key code "012" thus inputted by the operator is outputted to the bus 370 through the scan board 300 in the form of a key code signal indicative of the key-pushed actions of the numerical keys 320. The key code "012" thus outputted to the bus 370 is inputted to the CPU 330. Under these conditions, the CPU 330 is held under its condition waiting for the key holder signal from the key holder in step S412.

The F1 key 151 is disengaged out of the key holder 201 by the operator as shown in FIG. 1 before the CAMPRE key 154 is engaged with the key holder 201 as shown in FIG. 3 and is then pushed by the operator. With the key holder 201 of the CAMPRE key 154 pushed by the operator, the scan board 300 is operated to output the key holder signal indicative of the key-pushed action of the key holder 201 of the CAMPRE key 154 to the bus 370. The key holder signal indicative of the key-pushed action of the key holder 201 of the CAMPRE key 154 thus outputted is inputted to the CPU 330 through the bus 370. Under these conditions, the CPU 330 is held under its condition waiting for the key code signal from the RES key 342 in step S415.

When the RES key 342 is then pushed by the operator, the scan board 300 is operated to input the key code signal indicative of the key-pushed action of the RES key 342 to the CPU 330 through the bus 370. In accordance with the key holder signal and the key code signal thus inputted to the CPU 330, the CPU 330 is operated to have the specific relevant information between the key holder signal of the key holder 201 of the CAMPRE key 154 and the key code signal indicative of the key code "012" recorded by the memory 310 in step S416.

With the specific relevant information thus recorded by the memory 310, the CPU 330 is then operated to have the routine of the first operation state return to the starting state. After the routine of the first operation state is returned by the CPU 330 to the starting state, the CPU 330 is operated to end the first operation state of the memory 310, i.e., the information recording means and to resume the second operation state under which the key code signal in response to the key holder signal from the key holder signal inputting means 300a are outputted to the exterior appliance 390 in accordance to the specific relevant information recorded by the memory 310.

It is to be understood from the previous description that the keyboard apparatus according to the present invention can facilitate to change key code signals, i.e., the contents of the operation commands depending upon the needs by the operator to allow the operator to readily operate the keys.

While the above description is directed to the case that the key holder signal is inputted to the CPU 330 after the key code signal is inputted to the CPU 330, the key code signal may be inputted to the CPU 330 after the key holder signal is inputted to the CPU 330 according to the present invention. In the event that the key code signal is inputted to the CPU 330 after the key holder signal is inputted to the CPU 330, the CPU 330 is operated to carry out the steps S413 and S414 in place of the steps S411 and S412.

While the above embodiment has been described about the case that the F1 key 151 is disengaged out of the key holder 201 by the operator before the CAMPRE key 154 is engaged with the key holder 201 and is then pushed by the operator, the F1 key 151 may be pushed without being disengaged out of the key holder 201 by the operator according to the present invention. Under these conditions, the key holder 201 can output a key holder signal to the CPU bus 370 through the scan board 300. If the operator wishes to have the key top of the CAMPRE key 154 changed from the F1 key 151 under the above conditions, the changing operation may be effected at any time after the F1 key 151 is disengaged out of the key holder 201 by the operator according to the present invention.

Then, description will be made hereinafter to the case that the unnecessary key or keys are reduced to be ineffective. In order to clarify the description about the case, the following description will be directed to the cases that the F1 key 151 becomes ineffective on the key holder 201 in FIG. 1.

One of the above cases is that the F1 key 151 is disengaged out of the key holder 201 by the operator before the key holder 201 is covered by the cover 385. The other of the above cases is that the unnecessary key is given another key code signal indicative of a key code such as for example a key code "000" which does not work the specific relevant information recorded in the memory 310.

From the foregoing description, it is to be understood that the keyboard apparatus may be operated under the alternative cases. These cases make it possible for the operator to operate the keyboard apparatus 100 with reduced wrong operability and to enhance the operability of the keyboard apparatus 100.

Figure 6:
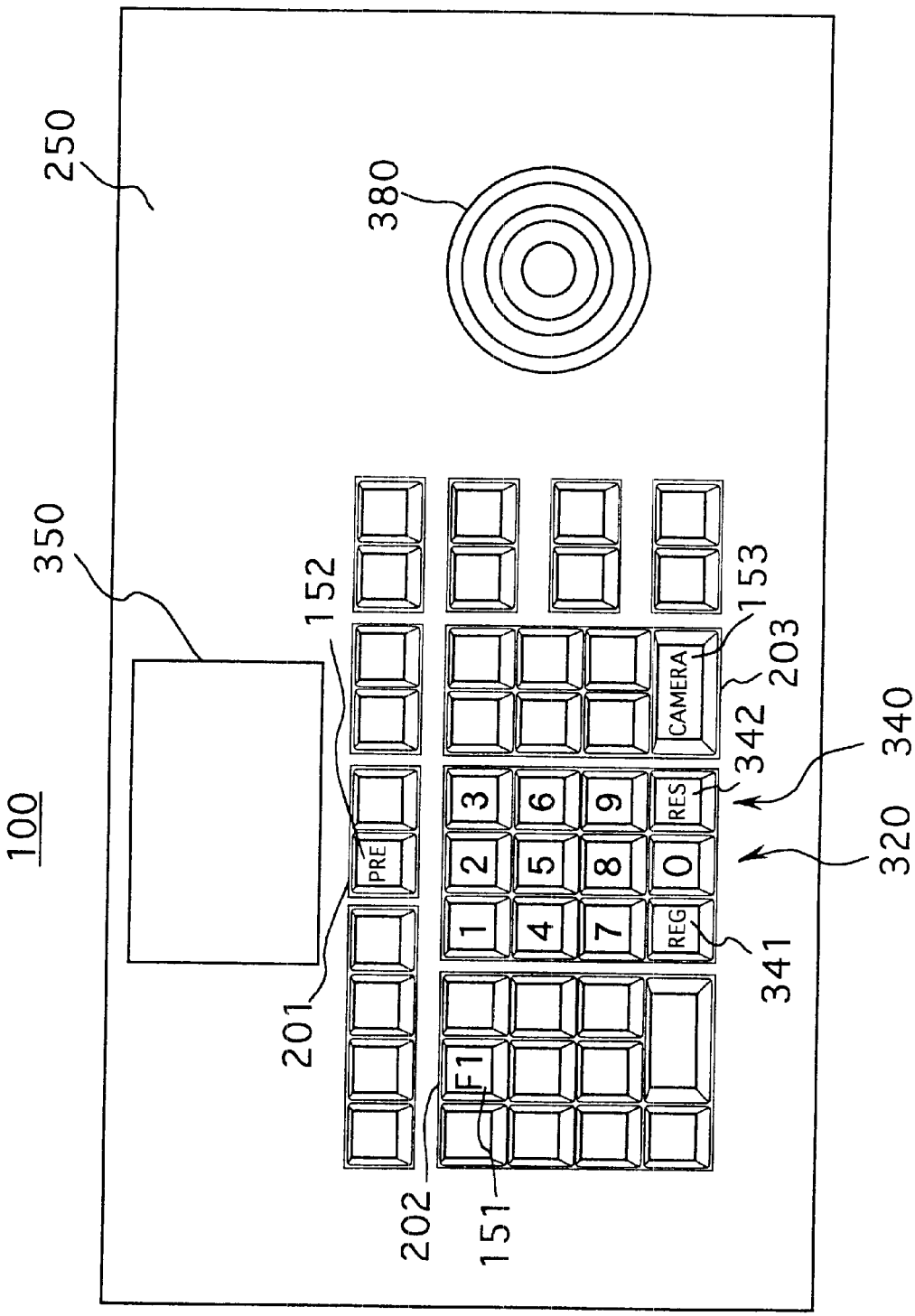
FIG. 6 is a plan view similar to FIG. 1 but showing keys disposed at respective desirable positions.

The following example will be directed to the case that the function and the key top of the key are changed to another function and the key top as shown in FIG. 6. This case is entirely the same as the case that the function and the key top of the PRE key 152 and the CAMERA key 153 are transferred to the F1 key 151 as will be seen from the steps S401 to S416 as shown in FIGS. 7 and 8.

The fact that the keyboard apparatus 100 according to the present invention comprises a LCD 350 can display the specific relevant information recorded in the memory 310 about the key holder signal indicative of the key holder and the key code signal indicative of the key code with the predetermined operation by the operator leads to the fact that the operator can confirm through the screen of the LCD 350 the content of the operation command effected by the key holder of the key to ensure that the content of the operation command is readily and reliably changed by the key holder of the key.

While it has been described in the above embodiment that the operator can recognize that the letter of the key top of the key is in special relationship with the key code through the key code on the back surface of the key top of the key, the operator can prepare a table indicating that the letter of the key top of the key is in special relationship with the key code to ensure that the foregoing special relationship is recognized by the operator in accordance with the table according to the present invention.

Although the above embodiment is provided with a plurality of numerical keys 320 which are used to have the key code signal inputting means 300b to input a desired key code, any other keys may be used in lieu of the numerical keys 320 according to the present invention as will be seen from the following embodiment.

For example, the alternative embodiment of the keyboard apparatus according to the invention may comprise key code signal inputting means 300b constituted by a LCD 350 and a joystick 380 to ensure that the key code is displayed on the screen of the LCD 350 under the first operation state of the CPU 330 to have the specific relevant information recorded in the memory 310. In this embodiment, the LCD 350 may display numbers constituting a key code in such a manner that the number is increased as the joystick 380 is moved in one direction while the number is decreased as the joystick 380 is moved in the other direction.

While it has been described in the foregoing embodiment that the state setting means 340 includes a REG key 341 retained by the key retainer 250 and forming a first operation state holding key for allowing the CPU 330 to assume the first operation state, and a RES key 342 retained by the key retainer 250 and forming a second operation state holding key for allowing the CPU 330 to assume the second operation state, the keyboard apparatus 100 according to the present invention may be constituted by any other means as long as the state setting means 340 can allow the CPU 330 to assume either the first operation state or the second operation state.

The previous keyboard apparatus 100 according to the present invention does not need such a RES key 342 forming part of the state setting means 340 if the key holder signal and the key code signal are concurrently inputted to the CPU 330 to hold the CPU 330 under the first operation state under which the specific relevant information between the key holder signal and the key code signal is recorded by the memory 310 in response to the key holder signal and the key code signal before the CPU 330 is held under the second operation state under which the key code signal in response to the key holder signal are outputted in accordance to the specific relevant information recorded by the memory 310.

The keyboard apparatus 100 according to the present invention may be constituted in combination with the exterior appliance 390 to have the CPU 330 and the memory 310 wherein the CPU 330 is operative to have the specific relevant information between the key holder signal and the key code signal recorded by the memory 310 from the exterior appliance 390 and to have the specific relevant information in the memory 310 recorded by the exterior appliance 390. In this way, the foregoing keyboard apparatus 100 ensures that the CPU 330 enables the specific relevant information to be exchanged between the memory 310 and the exterior appliance 390. As a consequence, the specific relevant information recorded by the exterior appliance 390 can readily be transferred to and recorded by the memory 310 for a new keyboard apparatus 100 changed by the old keyboard apparatus 100.

As will be seen from the foregoing description, it is to be understood that the keyboard apparatus according to the present invention makes it possible for the operator to change into his or her desired content of the operation command to be inputted through the keys disposed at respective desirable positions. The keyboard apparatus according to the present invention can thus bring about such an advantage that the change of the functions and the letters of the keys is readily changed only by operating the keys on the keyboard.

While it has been described in the above embodiment that the keyboard apparatus comprises a plurality of keys each being operative to input a key holder signal and a key code signal, the keyboard apparatus according to the present invention may comprise a plurality of first and second keys each operative to input first and second signals, respectively. The above alternative keyboard apparatus is operative to have each of the first keys to input the first signal indicative of the key-pushed action with the first keys each being able to have their key tops changed into their respective key tops desired by the operator and to have each of the second keys to input the second signal indicative of the key-pushed action with the second keys each being unable to have their key tops changed into their respective key tops. viz., with the key tops of the second keys being securely mounted on the respective key holders. The alternative keyboard apparatus comprises first and second signal inputting means for inputting to the signal processing means the first and second signals which are correspondent to the key holder signal and the key code signal, respectively in the former embodiment of the keyboard apparatus.

The remaining parts and elements of the latter embodiment of the keyboard apparatus is entirely the same in construction as those of the previously mentioned former embodiment of the key board apparatus, and will therefore not be described hereinafter.

While the present invention has thus been shown and described with reference to the specific embodiments, however, it should be noted that the invention is not limited to the details of the illustrated structures but changes and modifications may be made without departing from the scope of the appended claims.

What is claimed is:

1. A keyboard apparatus for controlling and operating at least one exterior appliance, comprising:
    a key retainer;
    a plurality of keys each operatively arranged on said key retainer to perform a key-pushed action and a key-released action, each of said keys being operative to input a signal indicative of said key-pushed action and including a key holder and a key top mounted on said key holder;
    key holder signal inputting means for inputting a key holder signal indicative of said key-pushed action of each of said keys when said key holder is operated and moved to perform said key-pushed action, said key holder signal inputting means including a plurality of non-numerical keys;
    key code signal inputting means for inputting a key code signal indicative of said key-pushed action of each of said keys when each of said keys is operated and moved to perform said key-pushed action, said key code signal inputting means including a plurality of numerical keys;
    information recording means for recording specific relevant information between said key holder signal inputted by said key holder signal inputting means and said key code signal inputted by said key code signal inputting means;
    signal processing means for receiving and processing said key holder signal from said key holder signal inputting means and said key code signal from said key code signal inputting means, and said signal processing means being operative to selectively assume two different operation states consisting of a first operation state under which said specific relevant information is formed based on said inputted key holder signal and said inputted key code signal to be recorded in said information recording means and a second operation state under which said key code signal is prepared in response to said key holder signal from said key holder signal inputting means in accordance to said specific relevant information recorded in said information recording means and then is outputted to said exterior appliance; and
    state setting means for selectively setting said first and second operation states by operating at least one specific key selected from among said keys.

2. A keyboard apparatus as set forth in claim 1, in which said non-numerical key of said key holder inputting means is given an own key code by said signal processing means, and said key top of said non-numerical key has an own letter indicating said key code at front surface thereof, said key top of said non-numerical key of said key holder inputting means being replaceable when said given key code is changed.

3. A keyboard apparatus as set forth in claim 1 which further comprises a display unit for displaying said specific relevant information between said key holder signal and said key code signal formed when said specific key is brought into said key-pushed action.

4. A keyboard apparatus as set forth in claim 1, in which said state setting means includes a first operation state holding key for allowing said signal processing means to assume said first operation state, and a second operation state holding key for allowing said signal processing means to assume said second operation state, each of said first and second operation state holding keys including a key holder, and a key top securely mounted on said key holder.

5. A keyboard apparatus as set forth in claim 1, in which said key retainer has a first area having a plurality of non-numerical keys and a second area having a plurality of numerical keys thereon, said key top of each of said non-numerical keys in said first area is detachably mounted on said key holder of each of said non-numerical keys to collectively constitute said key holder signal inputting means while said key top of each of said numerical keys in said second area is securely mounted on said key holder of each of said numerical keys to collectively constitute said key code signal inputting means.

6. A keyboard apparatus for controlling and operating at least one exterior appliance, comprising:
    a key retainer;
    a plurality of first and second keys each operatively arranged on said key retainer to perform a key-pushed action and a key-released action, each of said first keys being operative to input a first signal indicative of said key-pushed action of each of said first keys and each including a key holder, and a key top mounted on said key holder, and each of said second keys being operative to input a second signal indicative of said key-pushed action of each of said second keys and each including a key holder, and a key top mounted on said key holder;
    first signal inputting means for inputting a first signal indicative of said key-pushed action of each of said first keys when each of said first keys is operated and moved to perform said key-pushed action;
    second signal inputting means for inputting a second signal indicative of said key-pushed action of each of said second keys when each of said second keys is operated and moved to perform said key-pushed action;
    information recording means for recording specific relevant information between said first signal and said second signal;
    signal processing means for receiving and processing said first signal from said first signal inputting means and said second signal from said second signal inputting means, said signal processing means being operative to selectively assume two different operation states consisting of a first operation state under which said specific relevant information is formed in accordance with said inputted first signal and said inputted second signal to be record in said information recording means and a second operation state under which said second signal is prepared in response to said first signal from said first signal inputting means in accordance to said specific relevant information recorded by said information recording means and is outputted to said exterior appliance; and state setting means for selectively setting said first and second operation states operating at least one specific key selected from among said keys.

7. A keyboard apparatus as set forth in claim 6, in which said key holder of each of said first keys has an own key code represented by said first signal, and said key top of each of said first keys has own letters indicated thereon, said key top being changeable on the basis of said key code changed.

8. A keyboard apparatus as set forth in claim 6, in which said letters on key top of each of said first keys include alphabets and said letters on key top of each of said second keys include numbers.

9. A keyboard apparatus as set forth in claims 6, which further comprises a display unit for displaying said specific relevant information between said first signal and said second signal formed when said specific second key is brought into said key-pushed action.

10. A keyboard apparatus as set forth in claim 6, in which said second signal inputting means includes a plurality of numerical keys including a key holder, and a key top securely mounted on said key holder.

11. A keyboard apparatus as set forth in claim 6, in which said state setting means includes a first operation state holding key for allowing said signal processing means to assume said first operation state, and a second operation state holding key for allowing said signal processing means to assume said second operation state, each of said first and second operation state holding keys including a key holder, and a key top securely mounted on said key holder.

12. A keyboard apparatus as set forth in claim 6, in which said key retainer has a first area having said first keys arranged thereon and each constituted by a non-numerical key, and a second area having said second keys arranged therein and each constituted by a numerical key, said key top of each of said first keys detachably mounted on said key holder of each of said first keys to constitute said first signal inputting means while said key top of each of said second keys being securely mounted on said key holder of each of said second keys to collectively constitute said second signal inputting means.

13. A keyboard apparatus as set forth in any one of claims 9 to 12, in which said second signal inputting means includes a plurality of numerical keys including a key holder, and a key top securely mounted on said key holder.

14. A keyboard apparatus as set forth in any one of claims 9 to 12, in which said state setting means includes a first operation state holding key for allowing said signal processing means to assume said first operation state, and a second operation state holding key for allowing said signal processing means to assume said second operation state, each of said first and second operation state holding keys including a key holder, and a key top securely mounted on said key holder.

15. A keyboard apparatus as set forth in claim 9, which further comprises a first area having said first keys arranged therein and each constituted by a non-numerical key, and a second area having said second keys arranged therein and each constituted by a numerical key, said key top of each of said first keys detachably mounted on said key holder of each of said first keys to constitute said first signal inputting means while said key top of each of said second keys being securely mounted on said key holder of each of said second keys to collectively constitute said second signal inputting means.

* * * * *

UNITED STATES PATENT AND TRADEMARK OFFICE
CERTIFICATE OF CORRECTION

PATENT NO. : 6,686,905 B2
DATED : February 3, 2004
INVENTOR(S) : Kazuya Suzuki et al.

It is certified that error appears in the above-identified patent and that said Letters Patent is hereby corrected as shown below:

Drawings,
Please replace drawing Sheet 2 of 11 containing Fig. 2, with the attached drawing sheet containing Fig. 2.

Signed and Sealed this

Fourteenth Day of September, 2004

JON W. DUDAS
*Director of the United States Patent and Trademark Office*